United States Patent [19]

Fekete et al.

[11] 4,009,750
[45] Mar. 1, 1977

[54] APPARATUS FOR CONTROLLING THE COOLING OF A STRAND EMANATING FROM A CONTINUOUS CASTING MOLD

[75] Inventors: Kalman Fekete, Stafa; Werner Bruderer, Wattwil, both of Switzerland

[73] Assignee: Concast AG, Zurich, Switzerland

[22] Filed: July 24, 1975

[21] Appl. No.: 598,641

Related U.S. Application Data

[62] Division of Ser. No. 393,556, Aug. 31, 1973, Pat. No. 3,915,216.

[30] Foreign Application Priority Data

Sept. 6, 1972   Switzerland ................ 13120/72

[52] U.S. Cl. ........................ 164/154; 164/283 S
[51] Int. Cl.² .................................... B22D 11/16
[58] Field of Search ............. 164/4, 89, 122, 126, 164/128, 154, 283 R, 283 S

[56] References Cited

UNITED STATES PATENTS

| | | | |
|---|---|---|---|
| 3,204,301 | 9/1965 | Flemings et al. | 164/126 X |
| 3,417,810 | 12/1968 | Tiskus et al. | 164/154 X |
| 3,478,808 | 11/1969 | Adams | 164/82 X |
| 3,499,456 | 3/1970 | Rerecich et al. | 164/89 X |
| 3,614,978 | 10/1971 | Kosco | 164/283 R |
| 3,886,991 | 6/1975 | Meier et al. | 164/4 |

*Primary Examiner*—Robert Louis Spruill
*Attorney, Agent, or Firm*—Werner W. Kleeman

[57] ABSTRACT

An apparatus for controlling the cooling of a continuously cast strand departing from a continuous casting mold of a continuous casting installation, comprising computer means, a cooling device forming a total cooling zone for cooling of the continuously cast strand, said cooling device being divided into sections, and said cooling device being further subdivided into sub-groups. Cooling agent delivery means deliver cooling agent to the cooling device, and means cooperate with the cooling device sections for applying such cooling agent to the strand. There are also provided means for controlling the quantity of cooling agent delivered to the cooling device sections and sub-groups, said controlling means incorporating a respective regulator means connected to said cooling device sections and said sub-groups for regulating the quantity of cooling agent supplied to said sections and sub-groups to maintain constant the residence time of the cast strand in the total cooling zone, said respective regulator means further being directly connected to and controlled by said computer means.

3 Claims, 2 Drawing Figures

APPARATUS FOR CONTROLLING THE COOLING OF A STRAND EMANATING FROM A CONTINUOUS CASTING MOLD

CROSS-REFERENCE TO RELATED CASE

This application is a divisional-continuation application of our commonly assigned copending United States application Ser. No. 393,556, filed Aug. 31, 1973, now U.S. Pat. No. 3,915,216, granted Oct. 28, 1975 and entitled "Method And Apparatus For Controlling The Cooling Of A Strand Emanating From A Continuous Casting Mold."

BACKGROUND OF THE INVENTION

The present invention relates to a new and improved apparatus for controlling the cooling of a strand departing from a continuous casting mold wherein the quantities of cooling water impinging the surface of the strand at the individual cooling zone sections are adjustable and at the beginning of the casting operation there are determined by a computer reference or rated values of such quantities of cooling water as a function of the chemical or metallurgical composition of the strand material, strand cross-section and the desired casting speed, and during casting such rated values are changed as a function of the travel time of imaginary strand sections from the mold up to a relevant section of the cooling zone.

It is conventional practice during the continuous casting of steel to control the quantities of the cooling agent, typically water, at the so-called secondary cooling zone which follows the continuous casting mold. Consequently, the quantities of cooling water are adjusted at the individual zones, also referred to in the art as the cooling zone sections or regions, in such a way that there is realized an approximately constant surface temperature at the strand during its solidification. The values of the quantitative amounts of cooling water which should be set prior to the start of casting are determined by a computer as a function of the composition of the strand material, the strand cross-section and the desired casting time. The quantities of water introduced into the individual regions or zones of the secondary cooling zone becomes that much smaller the farther the relevant zone is located from the mold, since the thickness of the skin of the strand increases with increasing distance from the mold, whereby in the same way the heat conduction resistivity or resistance also increases. If during casting there occur changes in the above-mentioned influencing factors, especially the casting speed, then these changes can be taken into account to a certain degree. This occurs for instance in that the strand is subdivided into imaginary sections and there is fixed the time which the sections require for the travel from the mold up to the cooling device. As a function of this time, the computer selects from a prescribed curve the appropriate new quantity of cooling agent.

In practice, this technique has been associated with considerable drawbacks since it does not take into account the actual cooling and solidification conditions, and it is for this reason that the desired heat transmission rates cannot be controlled in accordance with the actual conditions. In order to nonetheless insure that in any event sufficient cooling water will be infed, the quantitative amount of such cooling water is generally selected to be greater than actually necessary. This of course results in increased consumption of water and at the same time can lead to impairment of the surface properties of the casting.

SUMMARY OF THE INVENTION

It is therefore a primary object of the present invention to provide a new and improved apparatus for controlling the quantity of cooling water applied to a strand within given cooling zones.

Another and more specific object of the present invention is to provide an improved apparatus for cooling a strand emerging from a continuous casting mold in a manner wherein it is possible to cool the strand material at the individual zones almost exactly to a degree which corresponds to the change in the heat conduction resistivity of the strand skin during increasing solidification or corresponding to the changes of the heat conduction resistivity at the individual zones owing to variations in the casting speed and the already transpired cooling.

Yet a further object of the present invention relates to a new and improved apparatus for cooling continuous castings wherein there is realized less consumption of water and there are obtained as good as possible surface properties of the cast strand.

Now, in order to implement these and still further objects of the invention, which will become more readily apparent as the description proceeds, the method aspects of this development contemplate that during casting, by integrating the speed of the individual strand sections over the travel time and simultaneously fixing or determining the residence time of a strand section in the cooling zone, there is determined by means of a computer the quantity of cooling agent applied to the individual sections, this value is compared with a quantitative reference value and there is determined the residual quantity of cooling agent which is still to be applied to such strand section. Dependent upon such residual quantity of cooling agent, after a time-displacement determined by the computer, there is altered the length of the individual cooling zone sections and/or the total length of the cooling zone and thus there is maintained constant in the total cooling zone the residence time of the individual strand sections.

In so doing, by means of the computer there is determined the cooling effect to which the individual strand sections only existing in the imagination, that is the imaginary strand sections would be subjected during passage through the preceding cooling sections. This occurs by integrating the speed of the individual strand sections over the travel time. At the same time, there is fixed the time spent by each of these imaginary strand sections in the cooling zone and the quantity of cooling agent applied during this time to each section. By integrating the speed of the individual strand sections it is possible to determine at any time where a section is located and by taking into account the time spent in the cooling zone the computer can determine by means of the stored cooling values where and over what time-span a strand section has been subjected to or is being subjected to certain cooling conditions. Appropriate corrections can be undertaken after comparison with the reference values immediately or with a time-delay dependent upon the casting speeds for the next successive cooling zone sections. This renders possible for each strand section a cooling action which corresponds to the actual conditions.

The length of the strand section is to be chosen as a function of the desired accuracy of the cooling effect and the capacity of the computer. Basically, the control functions with greater accuracy the smaller the length of the strand sections which are selected. The length of the strand section should be, however, in a certain relationship to the length of the cooling zone section. Also the length of the cooling zone sections, also referred to as the cooling zones, can be selected as a function of the desired cooling accuracy and the technical design of the installation as well as the capacity of the computer. Also in this case, if there is only considered the cooling process, the best results can be then realized when the sections are selected to be as small as possible. In such case the curve of the specifically applied quantity of water which is plotted as a function of time possesses a practically ascending course and there is possible an almost infinite accommodation of the cooling during change in the casting speed. The continuous course of the curve is best realized if during changes in the cooling operation the length of the individual cooling zone sections and the total length of the cooling zone are changed. However, in certain cases it is advantageous if only the length of the individual cooling zone sections or the total length of the cooling zone is changed. All three possibilities permit maintaining constant the residence time of the strand section in the total cooling zone, insuring for an exceptional strand and surface quality. Finally, it is possible during the entire casting operation to maintain the maximum permissible withdrawal of heat for realizing the desired quality and characteristics of the strand with the lowest possible consumption of water.

The apparatus for the performance of the method aspects comprises a process computer having input and output units, cooling agent-infeed means for a cooling device divided into sections, equipment or means for regulating the quantity of cooling agent for these sections, and a mechanism or means for applying the cooling agent to the strand material. Furthermore, the apparatus of this development is manifested by the features that the sections are sub-divided into sub-groups and the sections as well as the sub-groups possess their own respective regulator for controlling the quantity of cooling agent and possess a direct connection to the computer.

The computer in particular possesses inputs for the casting speed or velocity, the casting temperature and the temperature of the strand surface as well as the pressure of the cooling agent at the region of the spray nozzles. Furthermore, there are also provided, however, inputs for fixed values or parameters of the casting installation, for the shape or format of the cross-section, the chemical composition of the melt to be cast, disturbance functions brought about by the influence of an oxide layer and vaporfilm, the strand surface located at the region of the still liquid melt and effective for cooling, the empirically determined cooling function and the function of the specific cooling agent— or water consumption requirements existing as a function of time.

More specifically, as concerns the aforementioned influencing factors, the following is to be noted:

The specific water consumption or requirement per surface element is a function of the cooling time and therefore represents an average or mean value of the cooling agent with which there can be realized an optimum result as concerns quality and simultaneous economies during casting of a strand. This optimum curve can be ascertained by calculations and experiments. It is particularly determined by the cooling velocities or speeds possible during cooling of the strand without defects occurring at the strand, such as for instance fissures. Depending upon the casting speed, a certain strand section sooner or later departs from the mold. As a result, the effective cooling at the secondary cooling zone likewise proceeds with a corresponding time-displacement. This time-displacement is determined by the computer through continuous integration of the casting speed as a function of time and is compared with stored values and as a function thereof there is determined or changed the reference or rated value of the specific water consumption requirement at the individual cooling zone sections.

The surface considered to be decisive for cooling is the strand surface at the region of which there is still present a liquid core in the strand. In order to determine the specific water requirement along the cooling zone there must be taken into account the thickness of the solidified strand shell or skin. Depending upon the casting speed there always results a different skin or shell thickness at the individual cooling zones. For the practical working region there can be selected an average or mean value for the strand skin thickness per controllable cooling zone section. By means of this value there can be determined the water requirement, and by means of the width and the length of the relevant cooling zone section, it is thus possible to determine the optimum quantity of water which is to be applied per surface section.

At the beginning of a casting operation there is adjusted for each zone a reference value of the basic water quantity which is derived from the optimum water quantity. The adjustment of the basic water distribution in the cooling zone sections occurs by means of adjustable slides or possibly by appropriate nozzle arrangements or the like. The basic water quantity is influenced by the composition of the steel or working material. Depending upon the cast material, the water requirement based upon the surface is multiplied by a factor which is dependent upon the material which is to be cast. Also the disturbance functions are decisive influencing factors. A factor which is disturbing for cooling is the insulating oxide layers which have a different effective action at each zone. The change in the quantity of basic water required for this purpose at the individual zones is determined by experimentation or trial. The vapor film or layer which forms as a function of the quantity of cooling water also has an insulating effect, depending upon the impact pressure of the water. This effect or influence also can be likewise determined by trial.

The thus prescribed reference values undergo further changes during casting and which are dependent upon the casting speed or velocity and the casting temperature. The last-mentioned influencing factors are namely subject to considerable changes during casting. Taking such into account in the manner proposed by the invention, produces the result that it is thus possible to accommodate the different solidification and cooling requirements of the strand up to the relevant cooling zone which is to be controlled, these different solidification and cooling requirements of the strand resulting from the casting speeds which particularly change during casting. Taking into account the changes is especially possible in that, by virtue of a time-displacement determined by the computer, it is possible to change the length of the individual cooling zone sections and/or the total length of the cooling zone and thus the residence time of the strand sections at the total cooling zone can be maintained constant.

With an installation for carrying out the method aspects of this development, it is no longer possible to consider as separate from one another the secondary cooling zone and the withdrawal and straightening zone. This is so because particularly in the case of large increases in the casting speed, it may be necessary to extend the secondary cooling zone up to the withdrawal and straightening zone or in fact arrange such in a manner that it encompasses the entire withdrawal and straightening zone. On the other hand, it can be satisfactory for certain installations if only the first section of the cooling zone is controlled in accordance with the teachings of the present invention. For additionally monitoring the control, it is advantageous if the water quantity control circuits have superimposed thereon pressure control circuits. Instead of pressure control circuits or also simultaneous therewith there can be employed temperature control circuits.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
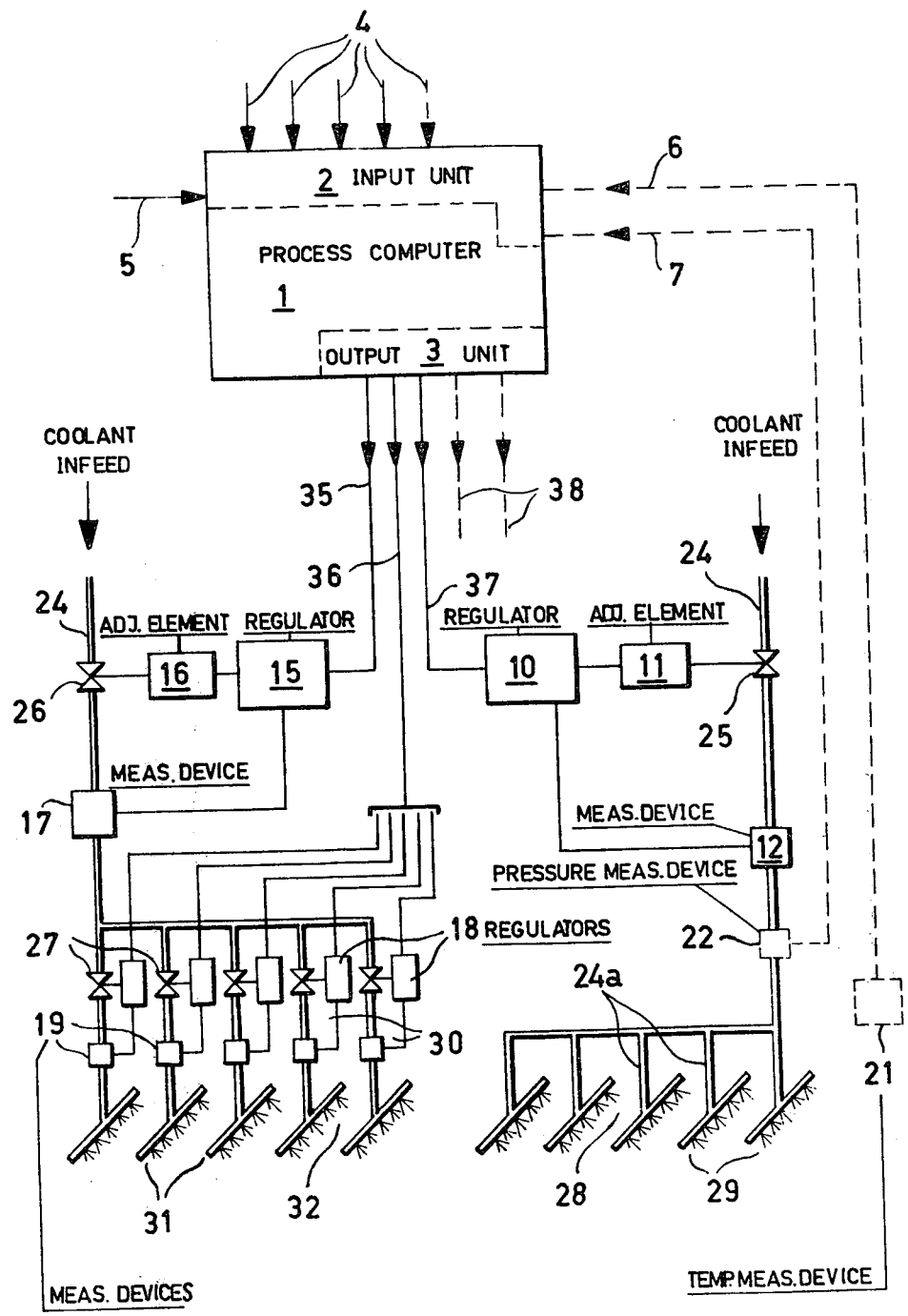
FIG. 1 is a schematic circuit diagram of an embodiment of control apparatus designed according to the teachings of the present invention.

Describing now the drawings, there is illustrated therein an exemplary embodiment of control apparatus embodying the teachings of this development which comprises a process computer 1 having an input unit or portion 2 as well as an output unit or portion 3. This computer 1 also is equipped with additional peripheral or auxiliary devices required for operating such computer 1. The input unit or portion 2 receives through the agency of input channels 4 information or data such as, for instance, the specific water requirements as a function of time, the empirically determined cooling function, the disturbance functions caused by slag and vapor layers, information concerning the chemical or metallurgical composition of the cast material, the cross-sectional format or shape, the desired casting speed and the casting temperature. The actual casting speed or velocity is introduced into the system through the agency of an input channel 5 and via channels 6 and 7 control data such as strand surface temperature and cooling agent pressure is directly fed back from in front of the spray nozzle into the computer 1. The process data determined by the computer 1 is then fed via the output unit or portion 3 and the output channels 35, 36, 37 and 38 to the sections or regions of the cooling zone to be controlled. Delivery of cooling agent to the spray devices or units 29, 31 occurs through the agency of cooling agent-infeed means 24 at which there are mounted quantitative regulator elements 25, 26, such as valves for instance.

Now in FIG. 1 there are illustrated two different possibilities for controlling cooling and the quantity of cooling agent. In the cooling zone section 28 illustrated at the right-hand portion of FIG. 1 and which encompasses the spray or distributor units 29, the quantity of cooling agent for all distributor or spray units 29 is collectively controlled by the valve 25. The valve 25, a measurement device 12, a regulator 10 and an adjustment element 11 thus form a control or regulator circuit for the cooling zone section 28. The relevant reference or rated values are received by the regulator 10 through the agency of the output channel 37 from the output unit or portion 3 of the computer 1. Directly in front of the point of distribution of the coolant or cooling agent from the infeed means or conduit 24 to the infeed lines 24a to the individual distributor or spray units 29 there is connected a pressure measuring device 22 which reports directly back to the computer 1, via the channel 7, the pressure of the cooling agent. Depending upon requirements there can be additionally arranged in the direction of strand travel, after the cooling zone section 28, temperature measuring devices 21 which report back to the computer 1, via the channel 6, the surface temperature of the cast strand.

Now at the left side of FIG. 1, there is illustrated a cooling zone section 32 which likewise contains a control or regulating circuit connected with the infeed line 24, this control circuit embodying a valve 26, adjustment element 16, regulator 15 and measuring device 17. The relevant reference or rated values decisive for the entire section or region 32 and determined by the computer 1 are delivered via the channel 35 to the regulator 15. The cooling zone section 32 for this embodiment is, however, subdivided into further subgroups or subordinate groups 30, wherein each subgroup is provided with its own valve 27. In this regard, the sub-groups 30 can encompass one or a number of spray or distributor units or devices 31. For each subgroup there is formed its own additional control or regulating circuit by means of the valve 27, regulator 18 and measuring or measurement device 19 which receives the reference value information directly from the computer 1 through the agency of the channel 36. By means of the valves 27 it is possible, in addition to the valve 26, to regulate the quantities of water delivered to the spray units 31. Each regulator 18 contains in a known manner the requisite components, such as comparator, transmission element and adjusting element. Additional non-illustrated cooling zone sections 28, 32 are connected via the output channels 38 with the comparator 1.

Whether the cooling zone sections are equipped with control devices corresponding to section 28 or with control devices corresponding to section 32 depends upon the desired accuracy of cooling. However, it is also possible to design the system with combinations of both possibilities, wherein for instance the upper cooling zone sections, related to the direction of strand travel, corresponding to section 32 are provided with valves 26 and 27 and the lower cooling zone sections corresponding to section 28 are only provided with one valve 25.

Figure 2:
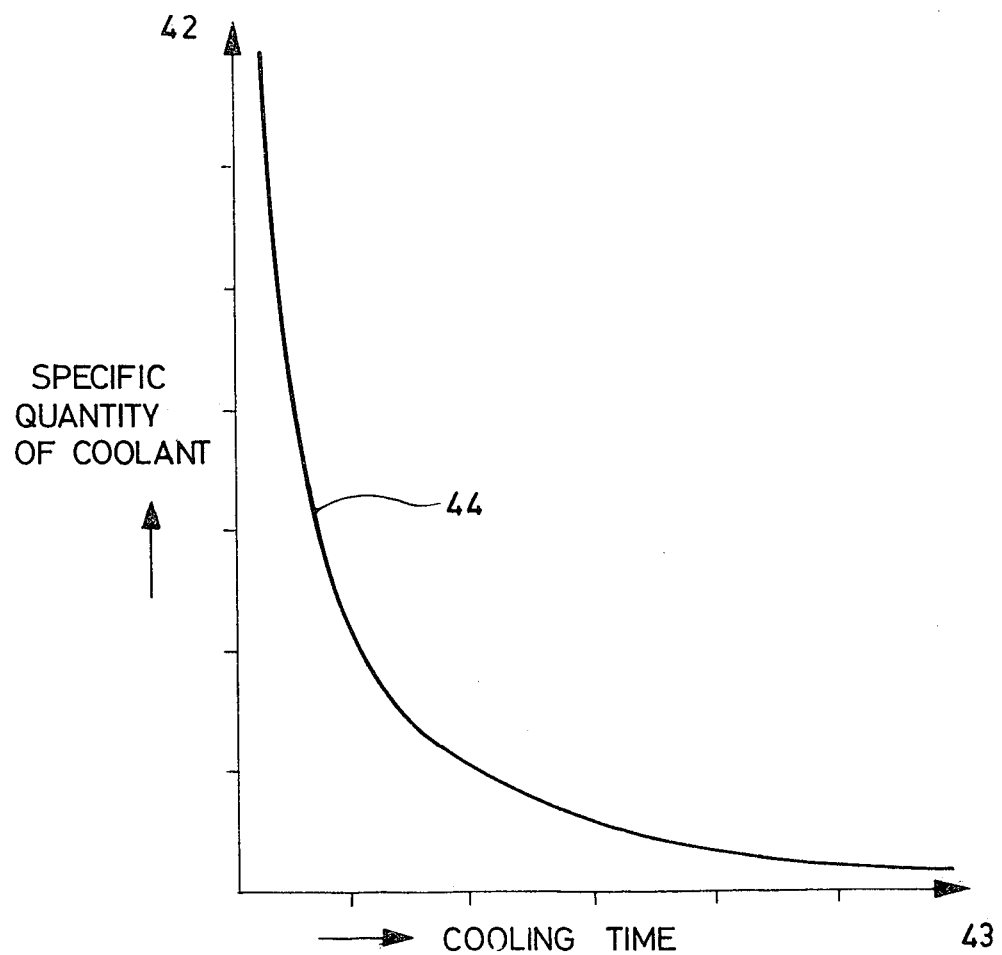
FIG. 2 is a curve portraying the dependency of the specific quantity of cooling agent e.g. water as a function of time.

Selection of the cooling agent-reference value at the computer 1 for the regulators 10, 15 and 18 takes place on the basis of the curve depicted in FIG. 2. Now in FIG. 2 there is plotted along the ordinate 42 the specific quantity of cooling agent or coolant in liters per surface- and time unit as a function of the cooling time which is plotted along the abscissa 43. Trials and calculations can provide curves which in their course approximately correspond to the course of the depicted curve 44. For the different cast materials and surface temperatures of the strand, there result different curves 44, all of which can be stored at the computer 1. Possible changes can be introduced via the channels 4 and the input unit 2.

Prior to the beginning of a pour, the necessary data such as composition of the strand material, cross-section of the strand and desired casting speed, are introduced into the computer 1 through the agency of the input channels 4 and 5, so as to select the necessary cooling agent reference or rated values. With the aid of these parameters, the computer 1 selects from the stored cooling agent curves and disturbance functions the necessary reference or rated values for the quantities of cooling agent. These are delivered via the output channels 35, 36, 37 and 38 to the regulators 10, 15 and 18. The course approximating the curve 44 is thus initially only set or adjusted by the regulators 10 and 15 and the regulator 18 imparts to the valves 27 an average position which permits a change in the quantity of cooling agent in the positive and negative direction. By means of the pressure measuring devices 22, it is possible for the computer to control whether the desired cooling agent program has been maintained. If this is the case, then it is possible to begin with the casting operation.

During casting, there is continuously delivered the momentary casting speed or velocity via the input channel 5 to the computer 1. Depending upon the capacity of the computer 1, the strand, during casting, is divided into imaginary more or less large sections and the velocity of these individual sections are continuously integrated over the casting time. At the same time, there is determined the time which is spent by each casting section at the cooling zone, since the cooling time which is identical with the residence time at the cooling zone should be maintained constant. Owing to these pre-requisites, the computer 1, through comparison with the reference quantities based upon the curves 44, determines the quantities of cooling agent which are still to be applied to such strand section. As a function thereof, and by virtue of controlling the quantity of cooling agent, there is altered the length of the individual cooling zone sections 32 as well as the total length of the cooling zone consisting of all of the cooling sections or regions 28, 32 which are in operation, so that the residence time of the individual strand sections at the total cooling zone remains constant notwithstanding changes in casting speed.

If the casting velocity decreases during the casting operation, then at the end of the cooling zone at least one cooling zone section 28 or 32 is switched-out and the quantity of cooling agent of the preceding cooling zone sections 28 and 32 is reduced in accordance with the reference value curve 44 stored at the computer 1. Such accommodation occurs through the agency of the regulators 10 and 15. However, a more exact control of the cooling process is possible if the length of the individual cooling zone sections 32 are additionally changed via the regulators 18 and the valves 27. In this regard, the quantity of cooling agent furnished by the spray units e.g. spray rings 31 via the regulator 15 and the valve 26 is still further changed by the regulators 18 and the valves 27, that is, does not remain constant throughout a cooling zone section 32. During reduction of the casting speed or velocity, less cooling agent is delivered to the spray rings 31 disposed at the end of the cooling zone section 32. If the casting speed is increased, then, in converse manner at the end of the cooling zone there are switched-in the cooling zone sections 28 or 32 and at the same time the spray nozzles or rings 31 located at the beginning of the cooling zone section 32 have more cooling agent delivered via the valves 27.

The selection of the number of cooling zone sections 28, 32 as well as the sub-groups 30 per cooling zone section 32 depends upon the capacity of the computer 1 and the prescribed limits of the erection and production costs of the continuous casting installation. Also the selection of the length of the imaginary strand sections depends upon the capacity of the computer 1 and the permissible operating costs. However, it has been found to be advantageous if the length of the imaginary strand sections amounts to approximately one-fifth of the length of the shortest cooling zone section 28, 32.

While there is shown and described present preferred embodiments of the invention, it is to be distinctly understood that the invention is not limited thereto, but may be otherwise variously embodied and practiced within the scope of the following claims. ACCORDINGLY,

What is claimed is:

1. An apparatus for controlling the secondary cooling of a continuously cast strand departing from a continuous casting mold of a continuous casting installation, comprising computer means, a cooling device arranged downstream of the casting mold and forming a total secondary cooling zone for secondary cooling of the continuously cast strand, said cooling device being divided into at least two sections, each of the sections of the cooling device being further subdivided into sub-groups, cooling agent delivery means for delivering cooling agent to the cooling device, means cooperating with said cooling device sections for applying cooling agent to the strand, means for controlling the quantity of cooling agent delivered to each of the cooling device sections and each of the sub-groups, said controlling means incorporating individual regulator means connected to each of said cooling device sections and to each of said sub-groups for regulating the quantity of cooling agent supplied to said sections and sub-groups to maintain constant the residence time of the cast strand in the total secondary cooling zone, said respective regulator means further being individually and directly connected to and controlled by said computer means and input means connected to said computer means for introducing cooling control data inputs to said computer means.

2. The apparatus as defined in claim 1, wherein said input means includes strand surface temperature measuring means in circuit with said computer means.

3. The apparatus as defined in claim 1, wherein said input means includes pressure measuring means for measuring the pressure of the cooling agent.

* * * * *